US012037227B2

(12) United States Patent
Yang et al.

(10) Patent No.: US 12,037,227 B2
(45) Date of Patent: Jul. 16, 2024

(54) COUNTER-BALANCED MOBILE DEVICE AND CRANE

(71) Applicant: SANY MOBILE CRANES CO., LTD., Hunan (CN)

(72) Inventors: Chun Yang, Hunan (CN); Long Su, Hunan (CN); Shangfeng Yang, Hunan (CN)

(73) Assignee: SANY MOBILE CRANES CO., LTD., Changsha (CN)

( * ) Notice: Subject to any disclaimer, the term of this patent is extended or adjusted under 35 U.S.C. 154(b) by 458 days.

(21) Appl. No.: 17/413,519

(22) PCT Filed: Feb. 21, 2019

(86) PCT No.: PCT/CN2019/075621
§ 371 (c)(1),
(2) Date: Jun. 11, 2021

(87) PCT Pub. No.: WO2020/118895
PCT Pub. Date: Jun. 18, 2020

(65) Prior Publication Data

US 2022/0024731 A1 Jan. 27, 2022

(30) Foreign Application Priority Data

Dec. 12, 2018 (CN) ......................... 201811520387.8

(51) Int. Cl.
*B66C 23/76* (2006.01)

(52) U.S. Cl.
CPC .................................... *B66C 23/76* (2013.01)

(58) Field of Classification Search
CPC .......... B66C 23/76; B66C 23/72; B66C 23/74
See application file for complete search history.

(56) References Cited

U.S. PATENT DOCUMENTS 3,236,391 A * 2/1966 Kennedy ................. B66C 23/76 212/196
3,378,148 A * 4/1968 Stanley ................... B66C 23/76 212/196

(Continued)

FOREIGN PATENT DOCUMENTS

CN 102229415 A 11/2011
CN 103539025 A 1/2014

(Continued)

OTHER PUBLICATIONS

English translation of the abstract of CN109279521A.
English translation of the abstract of CN103539025A.
English translation of the abstract of CN102229415A.

*Primary Examiner* — Sang K Kim
*Assistant Examiner* — Nathaniel L Adams
(74) *Attorney, Agent, or Firm* — Ladas & Parry LLP

(57) ABSTRACT

A counter-balanced mobile device and a crane are provided. The counter-balanced mobile device comprises a counter-weight rack (10), a connection assembly (20), a transmission assembly (30) and a driving member (40), wherein the counterweight rack (10) is configured to be connected with a turntable (100), and the connection assembly (20) is configured to be connected with a counterweight (200); and the connection assembly (20) is rotatably connected with the counterweight rack (10), the driving member (40) is fixed on the counterweight rack (10) and is connected with the connection assembly (20) by the transmission assembly (30) to drive the connection assembly (20) to rotate, so that the distance from the connection assembly (20) to a set reference on the counterweight rack (10) is adjusted. The counter-balanced mobile device can change the position of the counterweight (200) relative to the turntable (100) under the condition that the counterweight amount is unchanged, so (Continued)

that the counter-balancing performance and the stability of the crane are improved.

8 Claims, 2 Drawing Sheets

(56) References Cited

U.S. PATENT DOCUMENTS

| | | | | |
|---|---|---|---|---|
| 4,258,852 | A | 3/1981 | Juergens | |
| 4,557,390 | A | 12/1985 | Mick | |
| 5,348,172 | A | 9/1994 | Wilson | |
| 5,615,784 | A | 4/1997 | Pech et al. | |
| 2010/0294735 | A1* | 11/2010 | Walker | B66C 23/82 212/232 |
| 2016/0221804 | A1* | 8/2016 | Torghele | B66C 23/76 |

FOREIGN PATENT DOCUMENTS

| | | | | | |
|---|---|---|---|---|---|
| CN | 207597473 | U | * | 7/2018 | E02F 9/18 |
| CN | 109279521 | A | | 1/2019 | |
| DE | 4405780 | A1 | * | 8/1995 | B66C 23/74 |
| JP | 2001310895 | A | * | 11/2001 | |

* cited by examiner

COUNTER-BALANCED MOBILE DEVICE AND CRANE

CROSS-REFERENCE TO RELATED APPLICATIONS

This application is a national phase entry under 35 USC 371 of International Patent Application No.: PCT/CN2019/075621 filed on 21 Feb. 2019, which claims the benefit of Chinese Patent Application No. 201811520387.8 filed on 12 Dec. 2018, the entire contents of which are incorporated by reference.

TECHNICAL FIELD

The application relates to the technical field of cranes, in particular to a counter-balanced mobile device and a crane.

BACKGROUND ART

At present, there are two ways to increase the lifting capacity of the automobile crane under the same working condition: one way is to stop working, retract the supporting outriggers, enable the whole vehicle to move to a proper position, extend out the outriggers legs, and then carry out normal hoisting work. In this way, it not only causes low efficiency of the whole vehicle operation, but also increases the fatigue of an operator.

Another way is to add a counterweight. At present, cranes are mostly provided with fixed counterweights, especially for small and medium tonnage cranes. As the increase of the counterweight is limited by the operating condition table, it can only be solved by moving the whole vehicle when the counterweight is increased to a maximum.

The existing fixed counterweight structure limits the improvement of the hoisting performance. Since the moving performance of an automobile crane is not as good as that of a lorry-mounted crane and it is inconvenient to move the whole vehicle, how to develop a technical solution that can change the gravity center of the whole vehicle so as to increase the hoisting performance and the stability is a technical problem to be solved by a person skilled in the art.

SUMMARY OF THE INVENTION

The application aims to provide a counter-balanced mobile device and a crane so as to solve the technical problem that the improvement of hoisting performance is limited by a counterweight structure in the prior art.

The application provides a counter-balanced mobile device comprising a counterweight rack, a connection assembly, a transmission assembly and a driving member, wherein the counterweight rack is configured to be connected with a turntable, and the connection assembly is configured to be connected with a counterweight;

the connection assembly is rotatably connected with the counterweight rack, the driving member is fixed on the counterweight rack and is connected with the connection assembly by the transmission assembly to drive the connection assembly to rotate, so that the distance from the connection assembly to a set reference on the counterweight rack is adjusted.

Further, the transmission assembly comprises a first connecting rod and a second connecting rod, one end of the first connecting rod is rotatably connected with the counterweight rack, the other end of the first connecting rod is rotatably connected with one end of the second connecting rod, and the other end of the second connecting rod is rotatably connected with the connection assembly; and the driving member comprises a fixed part and a driving part, wherein the fixed part is fixed on the counterweight rack, the driving part can move linearly relative to the fixed part, and the driving part is connected with the first connecting rod.

Further, the driving member is an oil cylinder.

Further, the connection assembly comprises a swing rack and a lifting oil cylinder; the swing rack is connected with the transmission assembly, the fixed part of the lifting oil cylinder is fixed on the swing rack, and a piston rod of the lifting oil cylinder moves in a vertical direction and is configured to be connected with the counterweight.

Further, the swing rack comprises a connecting portion and a mounting portion, the connecting portion is rotatably connected with the counterweight rack, the mounting portion is barrel-shaped, and the lifting oil cylinder is inserted into the mounting portion.

Further, the counterweight rack is arranged in a rectangular shape, one side of the counterweight rack is configured to be connected with the turntable, and the connection assembly is rotatably connected with a side of the counterweight rack away from the turntable.

Further, the number of the connection assemblies is at least two.

Further, the number of the transmission assemblies and the number of the driving members are at least two, and the at least two connection assemblies, the at least two transmission assemblies and the at least two driving members are arranged in a one-to-one correspondence.

Further, the number of the connection assemblies is two, and the two connection assemblies are symmetrically and rotatably connected to the counterweight rack.

The application provides a crane comprising a frame, a turntable provided on the frame, and a counter-balanced mobile device provided by the application, wherein a counterweight rack in the counter-balanced mobile device is connected with the turntable.

In the process of using the counter-balanced mobile device provided by the application, the counterweight rack is arranged behind the turntable (the position of a suspension arm is the front), the connection assembly is connected with the counterweight rack, and the counterweight is connected with the connection assembly so as to complete the installation of the counterweight on the turntable, thereby achieving the effect of balancing.

In the construction process, the connection assembly can be driven by the driving member to rotate around the center of the rotary connection between the connection assembly and the counterweight rack, so that the distance between the connection assembly and a set reference on the counterweight rack is increased or reduced. After the distance between the connection assembly and the set reference is changed, the distance between the connection assembly and the turntable is also changed. That is, the connection assembly can move backwards (away from the direction of the turntable) or forwards (close to the direction of the turntable) relative to the turntable, and the connection assembly is connected with the counterweight, so that the counterweight can move, and the gravity center of the whole crane can be changed.

The counter-balanced mobile device provided by the application can change the position of the counterweight relative to the turntable, namely the position of the counterweight application point, under the condition that the counterweight amount is not changed, so that the gravity center of the crane is changed, the counter-balancing performance of the crane is improved, the whole crane is prevented from moving, and the stability of the crane is improved. Furthermore, the counter-balanced mobile device provided by the application is simple in structure and low in cost, and occupies small longitudinal space when the connection assembly moves relative to the turntable.

BRIEF DESCRIPTION OF THE DRAWINGS

The accompanying drawings, which constitute a part of this application, are included to provide a further understanding of the application.

The illustrative embodiments and descriptions of the application are provided to explain the application and are not to be construed as unduly limiting the application. In the drawings.

In the figures: 10—counterweight rack; 20—connection assembly; 30—transmission assembly; 40—driving member; 21—swing rack; 22—lifting oil cylinder; 23—lug; 31—first connecting rod; 32—second connecting rod; 211—connecting portion; 212—mounting portion; 100—turntable; 200—counterweight; 300—frame; 210—waist-shaped through hole; and 220—counterweight shaft sleeve.

DETAILED DESCRIPTION OF THE INVENTION

It should be noted that the embodiments and the features in the embodiments herein may be combined with one another without conflict. The application will now be described in detail, by way of embodiment, with reference to the accompanying drawings.

In the description of the application, it should be noted that the terms “mounted”, “connected”, or “connecting” should be understood in a broad sense, unless otherwise specifically stated and defined. For example, it can be fixedly connected, removably connected, or integrally connected; it may be connected directly or indirectly through an intermediary, and it may be internal connection of two elements. The specific meaning of the above terms in this application will be understood in specific circumstances by those of ordinary skill in the art.

Figure 1:
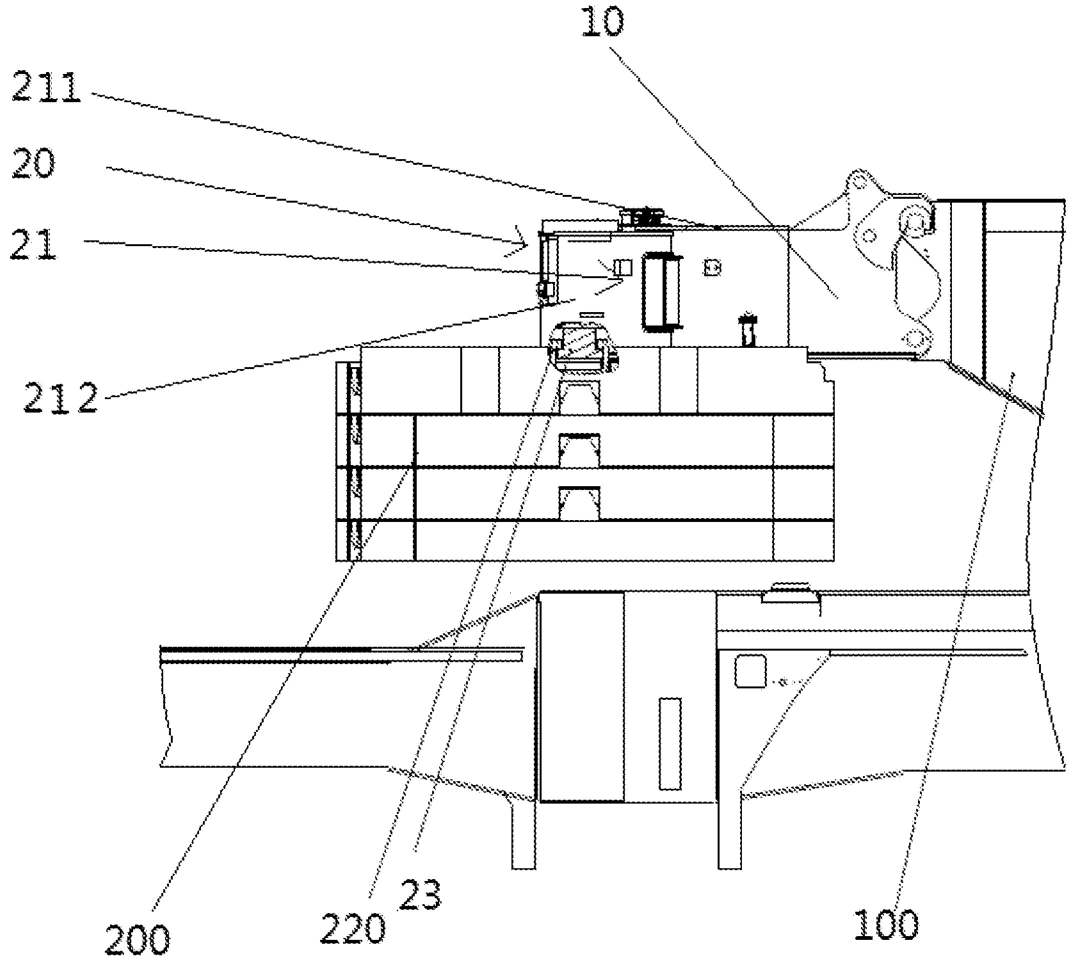
FIG. 1 is a structurally schematic view of a counter-balanced mobile device according to an embodiment of the application.
Figure 2:
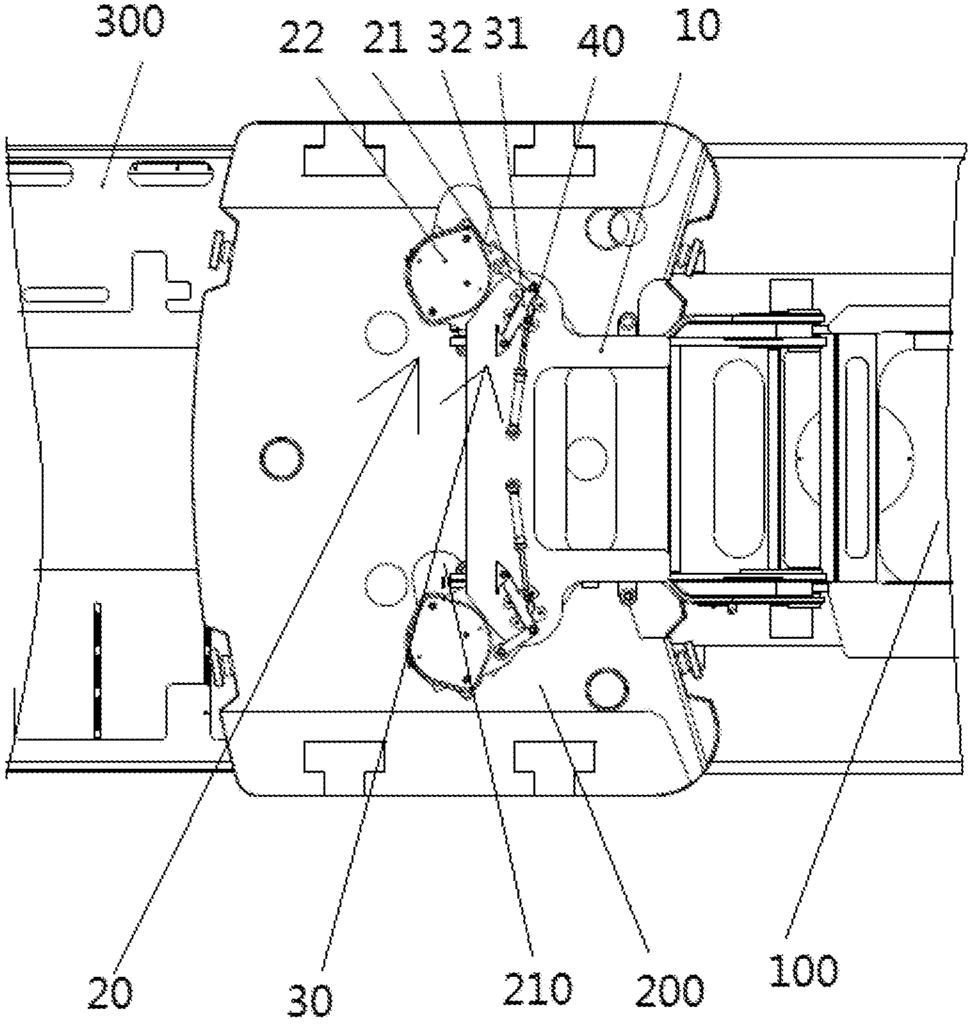
FIG. 2 is another structural view of the counter-balanced mobile device shown in FIG. 1.

As shown in FIGS. 1 and 2, the application provides a counter-balanced mobile device comprising a counterweight rack 10, a connection assembly 20, a transmission assembly 30, and a driving member 40, wherein the counterweight rack 10 is configured to be connected with a turntable 100, and the connection assembly 20 is configured to be connected with a counterweight 200; the connection assembly 20 is rotatably connected with the weight frame 10, and the driving member 40 is fixed on the weight frame 10 and connected with the connection assembly 20 by the transmission assembly 30 to drive the connection assembly 20 to rotate, so that the distance from the connection assembly 20 to a set reference on the counterweight rack 10 is adjusted In the process of using the counter-balanced mobile device provided by the embodiment, the counterweight rack 10 is installed behind the turntable 100 (the position of a suspension arm is the front), the connection assembly 20 is connected with the counterweight rack 10, and the counterweight 200 is connected with the connection assembly 20, so that the installation of the counterweight 200 on the turntable 100 is completed, and the effect of balancing is achieved.

In the construction process, the connection assembly 20 can be driven by the driving member 40 to rotate around the center of the rotational connection between the connection assembly 20 and the counterweight rack 10. When the connection assembly 20 swings backwards, the distance between the connection assembly 20 and the reference set on the counterweight rack 10 increases. When the connection assembly 20 swings forwards, the distance between the connection assembly 20 and the set reference on the counterweight rack 10 decreases. The set reference on the counterweight rack 10 can be various, such as a certain line on the counterweight rack 10; or a certain plane; or, a convex block arranged on the counterweight rack 10; and alternatively, a position of the counterweight rack 10 connected with the turntable 100. After the distance between the connection assembly 20 and the set reference is changed, the distance between the connection assembly 20 and the turntable 100 is also changed. That is, the connection assembly 20 can move backwards (away from the direction of the turntable 100) or forwards (close to the direction of the turntable 100) relative to the turntable 100, and the connection assembly 20 is connected with the counterweight 200, so that the counterweight 200 can move, and the gravity center of the whole crane can be changed.

For example, when the load is increased and the amount of the counterweight 200 reaches the maximum, the position of the connection assembly 20 relative to the turntable 100 can be increased, and the counterweight 200 moves backwards relative to the turntable 100, so that the gravity center of the crane moves backwards, achieving a balancing effect again; and the whole vehicle does not need to move, the stability of the whole vehicle is improved, and the hoisting performance is improved.

Of course, it is also possible to drive the connection assembly 20 to rotate by the driving member 40, so that the distance between the connection assembly 20 and the set reference is reduced. That is, the connection assembly 20 migrates relative to the turntable 100, thereby translating the counterweight 200 relative to the turntable 100.

The counter-balanced mobile device provided by the embodiment can change the position of the counterweight 200 relative to the turntable 100, namely the position of the application point of the counterweight 200, under the condition that the counterweight 200 amount is unchanged, so that the gravity center of the crane is changed, the counterweight 200 performance of the crane is improved, the whole crane is prevented from moving, and the stability of the crane is improved. In addition, the counter-balanced mobile device provided by the embodiment is simple in structure and low in cost, which occupies small longitudinal space when the connection assembly 20 moves relative to the turntable 100.

The structural form of the driving member 40 and the structural form of the transmission assembly 30 can be various. For example, the driving member 40 is a swing motor or a hydraulic swing motor or the like, and the transmission assembly 30 includes a transmission block.

Alternatively, as shown in FIG. 2, the driving member 40 comprises a fixed part and a driving part, wherein the fixed part is fixed to the counterweight rack 10, and the driving part can move linearly relative to the fixed part, and the driving part is connected with the first connecting rod 31; the transmission assembly 30 comprises a first connecting rod 31 and a second connecting rod 32, wherein one end of the first connecting rod 31 is rotatably connected with the counterweight rack 10, the other end of the first connecting rod 31 is rotatably connected with one end of the second connecting rod 32, and the other end of the second connecting rod 32 is rotatably connected with the connection assembly 20. The driving member 40 can be an electric telescopic rod, an air cylinder or a motor, a lead screw and a nut assembly and the like; and an oil cylinder is optionally adopted, so that the driving member 40 can be uniformly controlled by a hydraulic system of the crane for convenient control.

Specifically, the driving part of the driving member 40 and the connection assembly 20 are respectively located at both sides of the first connecting rod 31. In this case, when the counterweight 200 needs to be moved backwards, after the counterweight 200 is detached from the connection assembly 20, the driving part of the driving member 40 extends outwards to push the first connecting rod 31 to rotate in a direction close to the connection assembly 20; and the first connecting rod 31 drives the second connecting rod 32 to move, the second connecting rod 32 drives the connection assembly 20 to swing backwards, thereby increasing the distance of the connection assembly 20 relative to the turntable 100. When the connection assembly 20 swings forwards, the process of movement of the driving part of the driving member 40 is reversed from that described above.

The driving member 40 and the transmission assembly 30 provided in the embodiment are capable of stably and reliably driving and transmitting, thereby ensuring the normal swing of the connection assembly 20.

The structural form of the connection assembly 20 can be various. For example, the connection assembly 20 comprises a connecting column or a connecting rack, a hook can be arranged on the connecting column or the connecting rack, and the top of the counterweight 200 is provided with a hook hole matched with the hook; alternatively, the counterweight 200 is installed in a rack, and the rack in which the counterweight 200 is installed is hoisted by the connecting column or the connecting rack.

Alternatively, as shown in FIGS. 1 and 2, the connection assembly 20 comprises a swing rack 21 and a lifting oil cylinder 22; and the swing rack 21 is connected with the transmission assembly 30, the fixed part of the lifting oil cylinder 22 is fixed on the swing rack 21, and the piston rod of the lifting oil cylinder 22 moves in the vertical direction and is configured to be connected with the counterweight 200. The fixed part of the lifting oil cylinder 22 is positioned above, the telescopic rod of the lifting oil cylinder 22 is positioned below, and the counterweight 200 can be lifted and lowered.

In the embodiment, a lug 23 can be arranged at the top of the telescopic rod of the lifting oil cylinder 22, a waist-shaped through hole 210 is formed in the counterweight 200, a counterweight shaft sleeve 220 is arranged on the top of the counterweight 200 and at the waist-shaped through hole 210, and the lug 23 is hung in the counterweight shaft sleeve 220 to realize the connection of the counterweight 200 and the lifting oil cylinder 22.

Specifically, the lug 23 has an inverted T-shape in cross-section or other structures capable of forming a step. The counterweight shaft sleeve 220 is fixed on the waist-shaped through hole, the counterweight shaft sleeve 220 is arranged in a waist-shaped structure matched with the waist-shaped through hole 210, and one end of the counterweight shaft sleeve 220 is opened to enable the lug 23 of the lifting oil cylinder to be screwed in or out; and the counterweight shaft sleeve 220 shields an upward opened part of the waist-shaped through hole 210 to form a step to enable the lug 23 to be hung on the counterweight shaft sleeve 220 after entering the waist-shaped through hole, as shown in FIG. 1. The counterweight shaft sleeve 220 is shorter than the waist-shaped through hole 210, so that the lug 23 can be separated from or enter the waist-shaped through hole by an end of the waist-shaped through hole that is not shielded by the counterweight shaft sleeve 220.

The specific course of movement of the lug 23 may be as follows. The lug 23 enters the waist-shaped through hole 210 from the one end of the waist-shaped through hole 210, the turntable rotates, and the lug 23 is screwed into the counterweight shaft sleeve 220 from the open end of the counterweight shaft sleeve 220, so that the step of the lug 23 is hung with the step formed by the counterweight shaft sleeve 220, and the connection of the lifting oil cylinder and the counterweight is realized.

In the embodiment, when the counterweight 200 is separated from the swing rack 21, the lifting oil cylinder 22 is pushed downwards, the counterweight 200 falls on the frame 300, the lifting oil cylinder 22 continues to be pushed downwards until an upper plane of the lug 23 is separated from a lower plane of the counterweight shaft sleeve 220. Meanwhile, the turntable 100 rotates at a certain angle, and drives the swing rack 21 to rotate so as to drive the lug 23 of the lifting oil cylinder 22 to rotate; the lug 23 slides out of a notch of the counterweight shaft sleeve 220 to be separated from the counterweight shaft sleeve 220 to enter a position of the waist-shaped through hole which is not covered by the counterweight shaft sleeve 220, then the lifting oil cylinder 22 retracts, and the counterweight 200 is separated from the lifting oil cylinder 22. The process of hanging the counterweight 200 on the lifting oil cylinder 22 is reversed from the separation process.

According to the connection assembly 20 provided by the embodiment, automatic separation and hanging of the counterweight 200 can be realized, which is convenient for construction, avoids manual work, and saves time and labor.

In the process of adjusting the position of the counterweight 200 relative to the turntable 100, specifically, at the current position, the telescopic rod of the lifting oil cylinder 22 extends out to put the counterweight 200 on the frame 300; then, the telescopic rod continues to extend out to realize the separation of the lifting oil cylinder 22 and the counterweight 200; and the driving member 40 drives the swing rack 21 to rotate to a set position. The counterweight 200 of the frame 300 is moved to a position corresponding to the lug 23; and then, the lifting oil cylinder 22 extends downwards and extends into the waist-shaped through hole in the counterweight 200. The turntable 100 rotates to enable the lug 23 to be opposite to the counterweight shaft sleeve 220; the lifting oil cylinder 22 retracts to enable the lug 23 to be hung on the counterweight shaft sleeve 220; and the lifting oil cylinder 22 continues to retract, so that the counterweight 200 is hoisted to complete the connection of the counterweight 200 and the counterweight rack 10.

In this process, the movement of the counterweight 200 on the frame 300 may be accomplished in a variety of ways, for example, by an auxiliary tool such as a crane. Alternatively, the counter-balanced mobile device may further comprise a tray slidably provided on the frame 300 and a translation oil cylinder connected with the tray to drive the tray to slide on the frame 300, so as to automate the movement of the counterweight 200.

The connection mode of the lifting oil cylinder 22 and the swing rack 21 can be various. For example, the swing rack 21 comprises a supporting plate, and the fixed part of the lifting oil cylinder 22 is fixed with the supporting plate.

Alternatively, the swing rack 21 comprises a connecting portion 211 and a mounting portion 212, wherein the connecting portion 211 is rotatably connected with the counterweight rack 10, the mounting portion 212 is barrel-shaped, and the lifting oil cylinder 22 is inserted into the mounting portion 212. In the embodiment, the lifting oil cylinder 22 is inserted into the mounting portion 212, and the fixed part of the lifting oil cylinder 22 is fixedly connected with an upper end of the mounting portion 212. This structure can protect the lifting oil cylinder 22, and the fixing of the lifting oil cylinder 22 is stable and reliable.

As shown in FIG. 2, on the basis of the above-described embodiment, further, the counterweight rack 10 is provided in a rectangular shape, one side of the counterweight rack 10 is configured to be connected with the turntable 100, and the connection assembly 20 is rotatably connected with a side of the counterweight rack 10 away from the turntable 100. In the embodiment, the counterweight rack 10 has a simple structure, and the connection assembly 20 is rotatably connected with a side of the counterweight rack 10 away from the turntable 100, thereby facilitating the installation of the connection assembly 20.

It should be noted that the rectangular arrangement refers to a generally rectangular arrangement. As shown in FIG. 2, on the basis of the above-described embodiment, further, the number of the connection assemblies 20 is at least two. The number of the connection assemblies 20 is at least two, so that the installation of the counterweight 200 is more stable and reliable.

When the connection assemblies 20 are plural, it is preferable that the number of the transmission assemblies 30 and the number of the driving members 40 are at least two, and the at least two connection assemblies 20, the at least two transmission assemblies 30 and the at least two driving members 40 are arranged in a one-to-one correspondence. That is, a driving member 40 is connected with a connection assembly 20 through a transmission assembly 30, so that the driving control is independent of each other, and the control is simple and reliable.

Alternatively, the number of the connection assemblies 20 is two, and the two connection assemblies 20 are symmetrically and rotatably connected to the weight frame 10. The number of the connection assemblies 20 is two, so that the counterweight 200 can be stably installed, and the structural complexity caused by the excessive number of the connection assemblies 20 can be avoided.

On the basis of the embodiment, a first limiting piece and a second limiting piece can also be arranged to limit the swing rack 21 when the swing rack 21 is located at a first limit position (the maximum position swinging backwards), and limit the swing rack 21 when the swing rack 21 is located at a second limit position (the maximum position swinging forwards), so that the stability and the safety of the mobile device are improved.

The structural forms of the first limiting piece and the second limiting piece can be various. For example, the limiting piece (the first limiting piece or the second limiting piece) comprises a limiting block arranged at the limit position of the swing rack (a first limiting block is located at the first limit position, and a second limiting block is located at the second limit position); or the limiting piece comprises a travel switch, a position sensor and other elements capable of detecting the position of the swing rack; the element is in communication connection with a control system of the crane; and when the element detecting the position of the swing rack detects that the swing rack reaches the limit position, a signal is transmitted to the control system.

In the embodiment, due to the arrangement of the limiting piece, excessive rotation of the swing rack can be avoided, and it is convenient to use the swing rack.

The application also provides a crane comprising a frame 300, a turntable 100 provided on the frame 300, and a counter-balanced mobile device provided by the application, wherein a counterweight rack 10 in the counter-balanced mobile device is connected with the turntable 100.

The crane provided by the embodiment can change the position of the counterweight 200 relative to the turntable 100 by the counter-balanced mobile device, so that the counterweight 200 moves backwards or forwards, the hoisting performance and the stability of the crane are improved, and the flexibility is high.

The foregoing is only preferred embodiments of the application and is not intended to limit the application. Any modifications, equivalents, or improvements within the spirit and principles of the application are intended to be included within the scope of this application.

The invention claimed is:

1. A counter-balanced mobile device, comprising a counterweight rack, a connection assembly, a transmission assembly and a driving member, wherein the counterweight rack is connected with a turntable, the connection assembly is connected with a counterweight; the connection assembly is rotatably connected with the counterweight rack, the driving member is fixed on the counterweight rack and connected with the connection assembly through the transmission assembly, the driving member drives the connection assembly to rotate, so that the distance from the connection assembly to a set reference on the counterweight rack is adjusted, a swing rack is connected with the transmission assembly, a fixed part of a lifting oil cylinder is fixed on the swing rack, and a piston rod of the lifting oil cylinder moves in a vertical direction and is connected with the counterweight, the connection assembly comprises the swing rack; and the lifting oil cylinder; wherein the swing rack comprises a connecting portion and a mounting portion, the connecting portion is rotatably connected with the counterweight rack, the mounting portion is barrel-shaped, and the lifting oil cylinder is inserted into the mounting portion.

2. The counter-balanced mobile device according to claim 1, wherein the transmission assembly comprises a first connecting rod and a second connecting rod, one end of the first connecting rod is rotatably connected with the counterweight rack, the other end of the first connecting rod is rotatably connected with one end of the second connecting rod, and the other end of the second connecting rod is rotatably connected with the connection assembly; and the driving member comprises the fixed part and a driving part, characterized in that the fixed part is fixed on the counterweight rack, the driving part can move linearly relative to the fixed part, and the driving part is connected with the first connecting rod.

3. The counter-balanced mobile device according to claim 2, wherein the driving member is an oil cylinder.

4. The counter-balanced mobile device according to claim 1, wherein the counterweight rack is arranged in a rectangular shape, one side of the counterweight rack is be connected with the turntable, and the connection assembly is rotatably connected with a side of the counterweight rack away from the turntable.

5. The counter-balanced mobile device according to claim 4, wherein the number of the connection assemblies is at least two.

6. The counter-balanced mobile device according to claim 5, wherein the number of the transmission assemblies and the number of the driving members are at least two, and the at least two connection assemblies, the at least two transmission assemblies and the at least two driving members are arranged in a one-to-one correspondence.

7. The counter-balanced mobile device according to claim 6, wherein the number of the connection assemblies is two, and the two connection assemblies are symmetrically and rotatably connected to the counterweight rack.

8. A crane comprising a frame, a turntable provided on the frame, and a counter-balanced mobile device according to claim 1, wherein the counterweight rack in the counter-balanced mobile device is connected with the turntable.

* * * * *